Aug. 18, 1970   W. H. ANDERSON ET AL   3,524,952
COMBINED PIVOTAL AND LINEAR SWITCH ACTUATOR
Filed Sept. 25, 1968   2 Sheets-Sheet 1
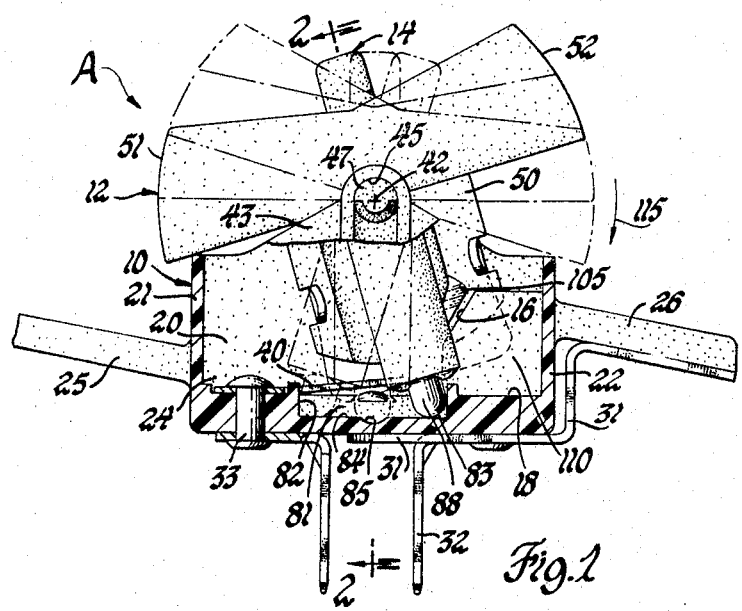
Fig.1
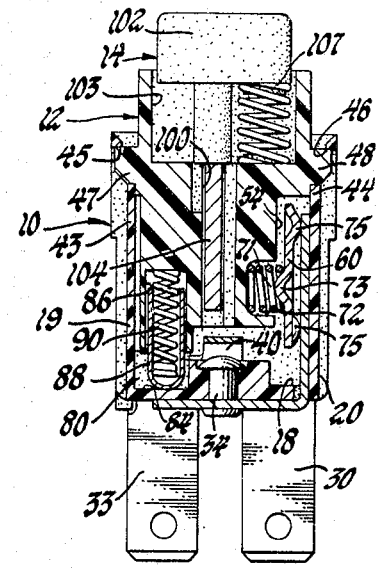
Fig.2
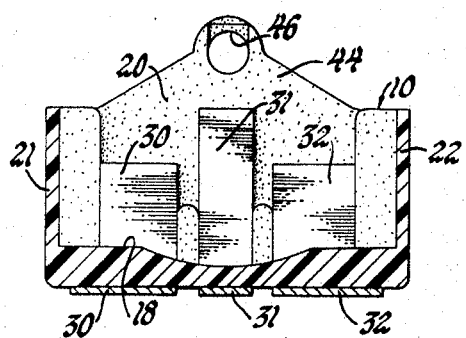
Fig.3
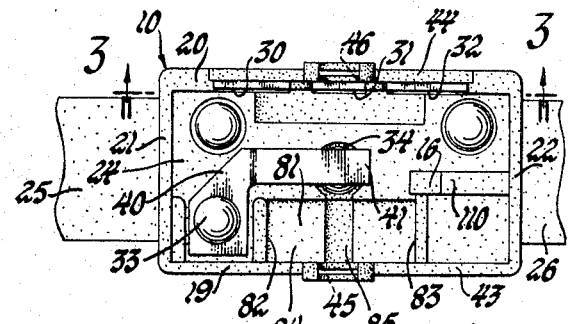
Fig.4
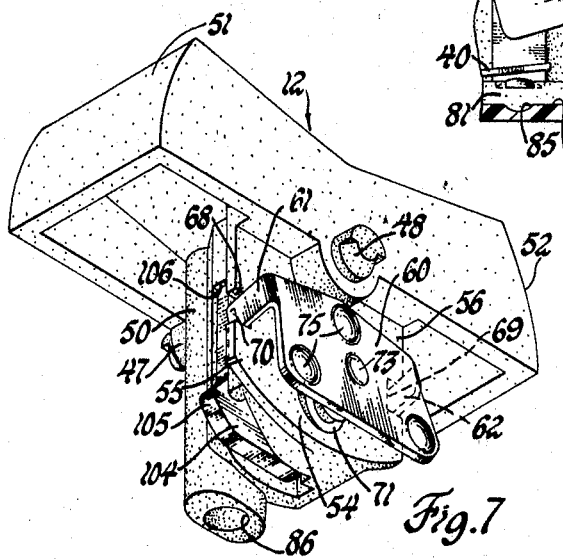
Fig.5
Fig.7
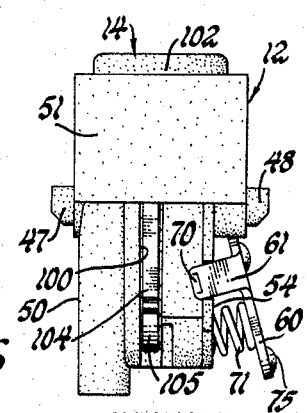
Fig.6
INVENTORS.
Willis H. Anderson,
Daniel W. Hyden, &
Frank Frier
W. A. Schuetz
ATTORNEY Aug. 18, 1970  W. H. ANDERSON ET AL  3,524,952
COMBINED PIVOTAL AND LINEAR SWITCH ACTUATOR
Filed Sept. 25, 1968  2 Sheets-Sheet 2

INVENTORS
Willis H. Anderson,
Daniel W. Hyden, &
Frank Frier

W. G. Schuetz
ATTORNEY

United States Patent Office 3,524,952
Patented Aug. 18, 1970

3,524,952
COMBINED PIVOTAL AND LINEAR SWITCH ACTUATOR
Willis H. Anderson, Anderson, Daniel W. Hyden, New Castle, and Frank Frier, Anderson, Ind., assignors to General Motors Corporation, Detroit, Mich., a corporation of Delaware
Filed Sept. 25, 1968, Ser. No. 762,485
Int. Cl. H01h 19/00
U.S. Cl. 200—6
4 Claims

ABSTRACT OF THE DISCLOSURE

In a preferred form, this disclosure relates to electric switch mechanisms for controlling energization and deenergization of a wiper unit and a washer unit of a windshield cleaning apparatus for an automotive vehicle. The switch mechanisms include a rocker type wiper switch actuator pivotally supported by a switch housing for movement between an off position and either a low or high speed position for effecting low and high speed wiper operation, respectively. The electric switch mechanisms also include a washer switch actuator slidably supported by the wiper switch actuator for linear movement relative thereto along an axis extending normal to the pivot axis of the wiper switch actuator. When the wiper switch actuator is in its off position and the washer switch actuator is depressed to initiate washer unit operation, it engages a cam on the switch housing to cause the wiper switch actuator to be simultaneously rocked or rotated to its low speed position so that joint operation of the wiper and washer unit is simultaneously effected.

---

The present invention relates to electric switch mechanisms, and in particular to electric switch mechanisms for controlling energization and deenergization of both a wiper unit and a washer unit of a windshield cleaning apparatus for an automotive vehicle.

Heretofore, switch mechanisms for controlling operation of both the wiper and washer units of an automotive vehicle have been provided. These known switch mechanisms have included manually manipulatable wiper and washer switch actuators for effecting energization and deenergization of the wiper and washer units, respectively. Also, in these known mechanisms the washer switch actuator is operable, when depressed, to momentarily complete a circuit to energize the washer unit while simultaneously effecting movement of the wiper switch actuator to a position to complete a circuit to energize the wiper unit, and with the wiper switch actuator remaining in the position to which it is moved upon release of the washer switch actuator.

Although these known switch mechanisms have been satisfactory in operation, they nevertheless have some drawbacks. Some have to be mounted in enlarged recesses in the dashboard of the vehicle or have enlarged recesses around the switch actuators in order to satisfy the requirements that they do not protrude outwardly of the dashboard and yet provide sufficient clearance space to enable them to be readily manually manipulated. Others utilize separate side-by-side actuators for the washer and wiper unit and with the two actuators being operatively interconnected with each other so that joint operation is effected upon depression of the washer actuator. This kind of switch does not lend itself to compactness and is relatively bulky and expensive to make. Examples of such known switch mechanisms can be found in U.S. Pats. Nos. 2,948,792, 2,993,098 and 3,317,683.

The electric switch mechanisms of the present invention are an improvement over the above noted known switch mechanism in that they accomplish the joint wiper and washer unit control in a novel manner. Moreover, they can be mounted on the dashboard so as to be substantially flush therewith, do not require a recess to enable the switch actuators to be manually manipulated, can be manipulated by use of a single finger, and are of a highly compact and economical construction.

Accordingly, it is an object of the present invention to provide a new and improved electric switch mechanism of the character described above and which is of a compact, highly practical and economical construction, which is substantially flush with the dashboard of the vehicle when mounted thereon, and which can be readily manipulated by using a single finger.

Another object of the present invention is to provide a new and improved switch mechanism of the character referred to above and which includes a wiper actuator pivotally supported by a switch housing for rocking movement between an off position and either a first or second on position in which it is effective to provide a low or high speed operation of the wiper unit, a generally centrally disposed washer switch actuator which is slidably supported by the wiper switch actuator for linear movement relative thereto between an off position and an on position, and wherein the washer switch actuator upon being moved from its off position towards its on position, when the wiper switch actuator is in its off position, engages a cam surface on the switch housing to cause the wiper switch actuator to be simultaneously rocked or rotated to its first on position so that joint operation of both the wiper and washer units can be simultaneously effected.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is an enlarged side elevational view, with portions shown in section, of a preferred embodiment of the switch mechanism of the present invention;

FIG. 2 is a cross-sectional view taken approximately along line 2—2 of FIG. 1;

FIG. 3 is a sectional view taken approximately along line 3—3 of FIG. 4;

FIG. 4 is a fragmentary top plan view of part of the switch mechanism shown in FIG. 1;

FIG. 5 is a fragmentary cross-sectional view of part of the switch mechanism shown in FIG. 1;

FIG. 6 is an end elevational view of part of the switch mechanism shown in FIG. 1;

FIG. 7 is a perspective view of part of the switch mechanism shown in FIG. 1;

FIG. 11 is a cross-sectional view taken approximately along line 11—11 of FIG. 10; and FIG. 12 is a fragmentary cross-sectional view taken approximately along line 12—12 of FIG. 10.

Figure 8:
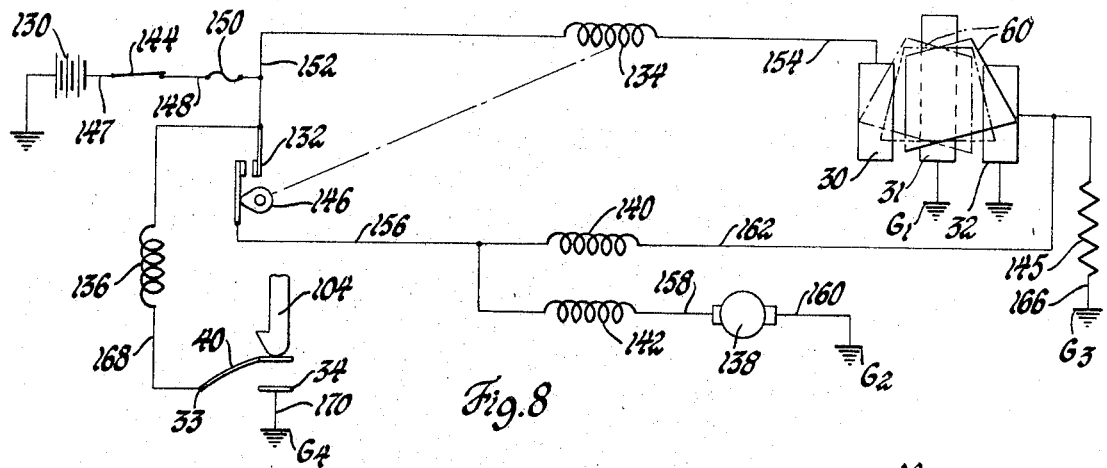
FIG. 8 is a schematic wiring diagram for illustrating how the switch mechanism shown in FIG. 1 controls operation of the wiper and washer unit of a windshield cleaning apparatus.

The present invention relates to electric switch mechanisms. In particular it relates to electric switch mechanisms for controlling energization and deenergization of a pair of electric circuits and which are operable to momentarily complete one of the circuits while simultaneously completing the other of the circuits. Although the electric switch mechanisms of the present invention could be used wherever such a switching function is required or desired, they are especially useful for controlling the operation of both a windshield wiper unit and a washer unit of a windshield cleaning apparatus for an automotive vehicle and thus, will be herein described as being used for the latter purpose.

As representing a preferred embodiment of the present invention, FIGS. 1 through 8 of the drawings show an electric switch mechanism A. The electric switch mechanism A broadly comprises a switch housing 10, a wiper switch actuator or button 12 pivotally supported by the switch housing 10 for movement between an off position and either a low speed position or a high speed position in which it respectively effects low and high speed operation of the wiper unit, and a washer switch actuator 14 slidably supported by the wiper switch actuator 12 for linear movement relative thereto for effecting washer unit operation when depressed. The washer switch actuator 14 also is adapted to cooperably engage a cam surface 16 on the switch housing 10 upon being depressed when the wiper switch actuator 12 is in its off position to rock or rotate the wiper switch actuator 12 to its low speed position so that simultaneous operation of the wiper and washer units can be effected.

The switch housing 10 comprises a generally rectangularly shaped, one-piece member made from a suitable electrically insulated or plastic material. The housing 10 has a bottom 18, a pair of spaced side walls 19 and 20 and a pair of spaced end walls 21 and 22. The bottom, side and end walls define a chamber 24. The switch housing 10 also includes a pair of integral mounting wings or flanges 25 and 26 to enable the same to be bolted or otherwise secured to a dashboard support structure (not shown) on the vehicle.

The switch housing 10 carries a plurality of stationary contacts 30–34. The contacts 30–32 are adapted to be operatively connected in circuits with an electric wiper motor for driving the wiper unit of the vehicle and the contacts 33 and 34 are adapted to be operatively connected in circuit with a relay for energizing the washer unit. The manner in which the contacts 30–34 are connected in circuit with the wiper motor and washer relay will be more fully described hereinafter. The contacts 30–32 are spaced from each other and include flat planar portions positioned against the side wall 20 and facing interiorly of the chamber 24 of the housing 10. The contacts 33 and 34 are secured to the bottom 18 at spaced locations. The housing 10 also carries a leaf spring 40 which is secured at one end to the contact 33 and which is self-biased so that its free end 41 is spaced from but located directly above the contact 34.

The wiper switch actuator 12 is pivotally supported by the switch housing 10 for movement in opposite directions about an axis 42 which extends parallel to the plane containing the bottom 18 of the switch housing 10. To this end, the side walls 19 and 20 of the switch housing 10 respectively include upwardly extending flexible portions 43 and 44 having aligned transverse openings 45 and 46 therein, and the wiper switch actuator 12 has a pair of integrally formed transversely extending pins 47 and 48 which extend through the openings 45 and 46. The wiper switch actuator 12 is pivotally connected to the side walls 19 and 20 of the switch housing 10 by spreading apart the flexible upper portions 43 and 44 of the side walls 19 and 20 from their normal position, as shown in FIG. 2, aligning the pins 47 and 48 on the wiper switch actuator 12 with the openings 45 and 46 and then releasing the side walls 19 and 20. Upon being released, the self-biasing forces of the flexible upper portions of the side walls 19 and 20 will return the same to their normal position, in which position the pins 47 and 48 will be respectively received within the openings 45 and 46 thereof.

The wiper switch actuator 12 is generally T-shaped so as to define a stem portion 50 which extends within the chamber 24 of the switch housing 10 and a pair of oppositely extending flange portions 51 and 52 at the upper end of the stem portion 50, as viewed in FIG. 1. The stem portion 50 has a flat side 54 facing toward the side wall 20 of the switch housing 10. The side face 54 is provided with lateral edge portions or flanges 55 and 56 which extend outwardly from the remaining part of the stem portion 50.

The stem portion 50 of the wiper switch actuator 12 carries a contact plate or bridge 60. The contact plate 60 is supported by the flanges 55 and 56 for limited movement toward and from the contacts 30–32 along the side wall of the switch housing 10. To this end, the contact plate 60 has a pair of rearwardly extending fingers or flanges 61 and 62 which respectively extend through notches 68 and 69 in the flanges 55 and 56. The fingers 61 and 62 at their ends remote from the contact bridge 60 are each peened inwardly, as indicated by reference numeral 70, so that portions of these ends extend or hook behind the flanges 55 and 56 adjacent the bottommost portion of the notches 68 and 69. The finger and notch arrangement provides for limited movement of the contact plate 60 laterally relative to the stem portion 50.

The bridge plate 60 is biased outwardly from the side 54 of the stem portion 50 and into engagement with the contacts 30–32 on the side wall 20 of the switch housing 10 by a compression spring 71. The spring 71 has one end in abutting engagement with the bottom of a recess 72 in the side face 54 of the stem portion 50 and its other end in abutting engagement with the contact plate 60. The contact plate 60 has a dimple 73, which is received within the end of the spring 71 which abuts the contact plate 60 for preventing lateral sliding movement of the spring 71 relative to the contact plate 60. The contact plate 60 also includes outwardly extending dimples 75 on its face adjacent the stationary contacts 30–32 in order to reduce friction and facilitate movement of the contact plate 60 across the stationary contacts 30–32 when the wiper switch actuator 12 is moved.

The wiper switch actuator 12 is rotatable or rockable between an off position, as shown in the solid lines in FIG. 1, to either a first or low speed position, as shown by the dot-dash lines in FIG. 1, or a second or high speed position, as shown by the dash-double dot lines in FIG. 1. When the wiper switch actuator 12 is in its off position the contact plate 60 bridges contacts 31 and 32 to provide a conductive path therebetween. When the wiper switch actuator is in its low speed position, the contact plate bridges all three of the stationary contacts 30–32 to provide conductive paths therebetween and effect low speed operation of the wiper motor. When the wiper switch actuator 12 is in its high speed position, the contact plate bridges only the contacts 30 and 31 to provide a conductive path therebetween and effect high speed operation of the wiper motor.

The wiper switch actuator 12 also carries a detent means 80 which cooperates with means on the bottom of the switch housing 10 to releasably detent the wiper switch actuator 12 in the position to which it is moved. As best shown in FIGS. 1 and 4, the bottom of the switch housing 10 includes a recess 81 whose ends define abutments 82 and 83. The recess at its bottom 84 midway between its ends 82 and 83 has formed therein a transversely extending groove 85. As best shown in FIG. 2, the stem portion 50 of the wiper switch actuator 12 has an opening 86 therein facing toward the bottom 84 of the recess 81 and which slidably receives a hollow, cylindrical detent 88 having a rounded end. The detent 88 is biased into engagement with the bottom 84 of the recess 81 by a compression spring 90. The compression spring 90 has one end in abutting engagement with the bottom of the opening 86 in the stem portion 50 and the other end in abutting engagement with the rounded end of the detent 88.

When the wiper switch actuator 12 is in its off, low speed and high speed positions, the detent 88 respectively engages the abutment 83, the bottom of the groove 85, and the abutment 82. As can be seen from FIG. 1, the arcuate path of movement of the wiper switch actuator 12 and the relationship between the detent 88 and the bottom 84 of the recess 81 is such that to move the wiper switch actuator 12 about the pivot axis 42 from one position toward another it is necessary that the detent 88 be cammed upwardly into the opening 86 in opposition to the biasing force of the spring 90. The pressure force exerted by the spring 90 when the switch actuator 12 is in any one of its three positions is sufficient to detent or hold the wiper switch actuator 12 in that position unless the operator deliberately moves the same.

In accordance with one of the features of the present invention, the wiper switch actuator 12 also slidably supports the washer switch actuator 14 for linear movement relative thereto along an axis which preferably intersects and extends normal to the pivot axis 42. The washer switch actuator 14 is slidably received in a central through opening 100 extending through the stem portion 50 and the juncture of the flange portions 51 and 52. The washer switch actuator 14 comprises a plastic, rectangularly shaped push button 102 which is slidably received in an enlarged, complementary shaped recess portion 103 of the opening 100 and a stepped, flat, metal depending leg 104 secured to the push button 102. The leg 104 includes a laterally projecting portion or toe 105 at its end adjacent the bottom 18 of the switch housing 10.

As best shown in FIGS. 2 and 7, the washer switch actuator 14 is normally biased toward an off position in which the step in the leg 104 engages an abutment surface 106 on the stem portion 50 of the wiper switch actuator 12, by a compression spring 107. The compression spring 107 has one end in abutting engagement with the underside of the push button 102 and the other end in abutting engagement with the bottom of the enlarged recess portion 103 of the opening 100. The washer switch actuator 14 is manually movable from its off position, as shown in FIG. 2, to an on position in which the metal leg portion deflects the leaf spring 40 into engagement with the contact 34 to provide a conductive path between the contacts 33 and 34 by manually depressing the push button 102 in opposition to the biasing force of the spring 107. When the push button 102 is released, the spring 107 will return the washer switch actuator 14 to its off position.

In accordance with another feature of the present invention, the washer switch actuator 14 is operable, when the wiper switch actuator 12 is in its off position, to rock or rotate the wiper switch actuator 12 from its off position to its low speed position upon being depressed to energize the washer unit so that energization of both the wiper and washer units can be effected simultaneously. As best shown in FIGS. 1 and 5, the cam surface 16 is beveled or tapered and formed on an upwardly extending cam or web 110 integral with the bottom 18 of the switch housing 10. When the wiper switch actuator 12 is in its off position, as shown by the solid lines in FIG. 1, the beveled cam surface 16 lies in the path of movement of the projecting portion 105 of the leg 104 of the washer switch actuator 14 should the latter be depressed.

Depression of the washer switch actuator 14 to initiate operation of the washer unit when the wiper actuator switch is in its off position causes the toe 105 of the depending leg 104 of the washer switch actuator 14 to engage the cam surface 16. As the washer switch actuator 14 is further depressed, the engagement between the toe 105 and the cam surface 16 causes the leg 104 and hence, both the washer and wiper switch actuators to be rotated in the direction of the arrow 115. Movement in this direction causes the detent 88 to be moved upwardly into the opening 86 of the stem portion 50 of the wiper switch actuator 12 and the latter to be rocked or moved from its off position to its low speed position, as shown by the dot-dash lines in FIG. 1. The detent 88 snaps into the groove 85 as the wiper switch actuator 12 reaches its low speed position so as to hold and prevent travel thereof past the low speed position. This results in simultaneous energization of both the wiper motor for the wiper unit and the washer relay for the washer unit, since movement of the wiper switch actuator 12 to its low speed position causes the contact plate 60 to bridge all three stationary contacts 30–32 and movement of the wiper switch actuator 12 to this position enables the washer switch actuator 14 to be fully depressed to deflect the leaf spring 40 into engagement with the contact 34 to energize the washer unit relay.

It should be noted that when the wiper switch actuator 12 is either in its low speed position or its high speed position, depression of the washer switch actuator will merely deflect the leaf spring 40 into engagement with the contact 34 to energize the washer unit without effecting the position of the wiper switch actuator 12. This enables the washer unit to be energized while the wiper unit is already operating.

Referring to FIG. 8, a control circuit means embodying the switch mechanism A for controlling operation of a wiper motor of a wiper unit and a washer relay of a washer unit is there schematically shown. The control circuit means includes a D.C. battery 130 having one terminal connected to ground, a park switch 132 for the wiper unit and its associated relay 134, a washer unit relay 136, an electric motor which includes an armature 138 and shunt and series field windings 140 and 142, respectively, an ignition switch 144, resistor 145, the stationary washer switch contacts 33 and 34 and the stationary wiper switch contacts 30–32. The park switch 132 is in the form of a leaf spring which is self-biased toward a closed position, but normally held in an open position by a cam 146 connected to the wiper motor when the windshield wipers are in their parked position. The wiper and washer units could be of any suitable or conventional construction, such as those presently on automobiles manufactured by General Motors Corporation. Since they do not per se form a part of the present invention, they have not been shown and described in detail.

When the operator of the vehicle desires low speed operation of the wiper unit, he will push on the flange portion 52 of the wiper switch actuator 12 with his finger to move the same from its off position to its low speed position, as shown by the dot-dash lines in FIG. 1. Movement of the wiper actuator switch 12 to its low speed position causes the contact plate 60 to be moved to the dotted line position shown in FIG. 8 in which it bridges all three stationary contacts 30–32 to provide a conductive path therebetween. Movement of the contact plate to this position causes a circuit D to be completed to energize the park switch relay 134. This circuit is from battery 130, wire 147, ignition switch 144, wire 148, fuse 150, wire 152, park switch relay 134, wire 154, contact 30, bridge plate 60, contact 31, to ground $G_1$.

Energization of the park switch relay 134 causes the normally open park switch 132 to be moved to its closed position. Movement of the park switch 132 to its closed position causes circuits E and F for energizing the wiper motor to be completed. The circuit E is from battery 130, wire 147, ignition switch 144, wire 148, fuse 150, wire 152, now closed park switch 132, wire 156, series field winding 142, wire 158, the motor armature 138, wire 160 to ground $G_2$. The circuit F is from wire 156, shunt field windings 140, wire 162, stationary contact 32, bridge plate 60, contact 31 to ground $G_1$. In the low speed position the shunt field windings are fully energized. The completion of the circuits E and F energizes the wiper motor to operate the windshield wipers at low speed.

When the wiper switch actuator 12 is moved from its low speed position to its off position, the circuit D for the park switch relay 134 is broken and the park switch relay 134 is deenergized. The park switch 132, however, remains closed since it is self-biased to the closed position to keep the circuits E and F energized. The park switch 132 remains closed until the wiper motor moves the windshield wipers to their parked position at which time the cam 146 engages the park switch to move the same to its open position to break the circuits E and F to deenergize the wiper motor.

When the operator desires high speed operation, he will move the wiper switch actuator 12 to its high speed position as indicated by the dash-double dot lines in FIG. 1. Movement of the wiper switch actuator 12 to this position moves the contact plate 60 to the dot-dash position shown in FIG. 8 in which it bridges only the stationary contacts 30 and 31. Movement of the contact plate 60 to this position completes the hereinbefore described circuit D for energizing the park switch relay 134. Energization of the park switch relay 134 closes the park switch 132 to cause the circuit E to be energized. The circuit F, however, through ground $G_1$ for energizing the shunt field windings 140 is not energized, since the contact plate does not bridge the contacts 32 and 31 in the high speed position. When the bridge plate 60 is moved to the high speed position, the shunt field windings 140 are energized via circuit H through the resistor 145 whereby the shunt field windings 140 are only partially energized which causes the wiper motor to operate at high speed, and in a manner well known to those well skilled in the art. The circuit H is from the park switch 132, wire 156, shunt field windings 140, wire 162, resistor 145, wire 166 to ground $G_3$.

If the wiper switch actuator 12 is either in its low speed or high speed position and the operator desires to energize the washer unit, he will merely depress the washer switch actuator 14. In either of these positions the washer switch actuator 14 will not engage the cam surface 16. When the washer switch actuator 14 is depressed, it deflects the leaf spring 40 into engagement with the contact 34 to complete a circuit J to energize the washer unit relay 136. Circuit J is from battery 130, wire 147, ignition switch 144, wire 148, fuse 150, wire 152, washer relay coil 136, wire 168, contact 33, leaf spring 40, contact 34, wire 170 to ground $G_4$. This energizes the washer unit to squirt fluid under pressure against the windshield of the vehicle.

When the wiper and washer switch actuators 12 and 14 are in their off position and the operator desires joint operation of the washer unit and the wiper unit, he need only momentarily depress the washer switch actuator 14. Depression of the washer switch actuator 14 causes the toe 105 of the leg 104 of the washer switch actuator 14 to engage the beveled cam surface 16. The washer switch actuator 14 upon engaging the cam surface 16 causes the wiper and washer switch actuators to be both rocked or rotated about the axis 42 and with the wiper switch actuator being moved from its off position towards its low speed position. As the wiper switch actuator 12 approaches its low speed position, the leg 104 of the washer switch actuator 14 clears the cam surface 16 so that further depression thereof causes the leaf spring 40 to be deflected against the contact 34. Simultaneous movement of the wiper switch actuator 12 to its low speed position and the leaf spring 40 into engagement with the contact 34 causes the hereinbefore described circuits D, E, F and J to be energized to effect simultaneous energization of the wiper motor for the wiper unit as well as the relay 136 for the washer unit.

As representing another embodiment of the present invention, FIGS. 9 through 12 show a switch mechanism B. The switch mechanism B is of a substantially similar construction to the switch mechanism A except that it has a different contact plate and detent arrangement for bridging the stationary contacts of the wiper switch and for releasably holding the wiper switch actuator in the position to which it is moved. The parts of the switch mechanism B which are identical or substantially similar to corresponding parts of the switch mechanism A will be given the same reference numerals, but with a prime affixed thereto.

Figure 9:
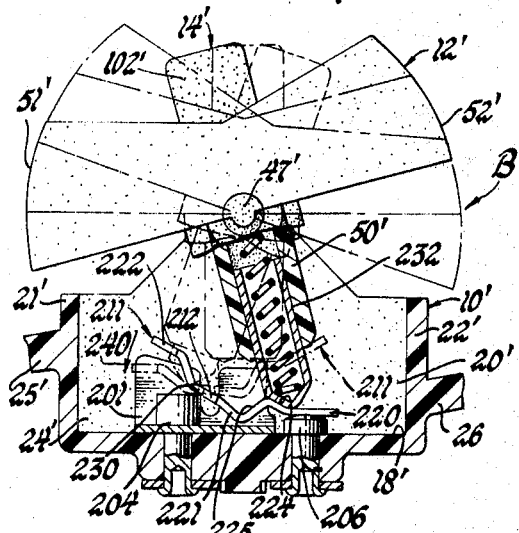
FIG. 9 is an elevational view with portions shown in sections of an alternate embodiment of the electric switch mechanism of the present invention.
Figure 10:
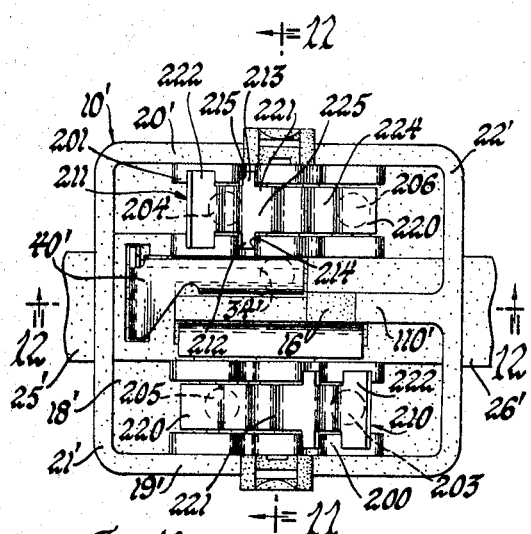
FIG. 10 is a top plan view of part of the switch mechanism shown in FIG. 9.
Figure 22:
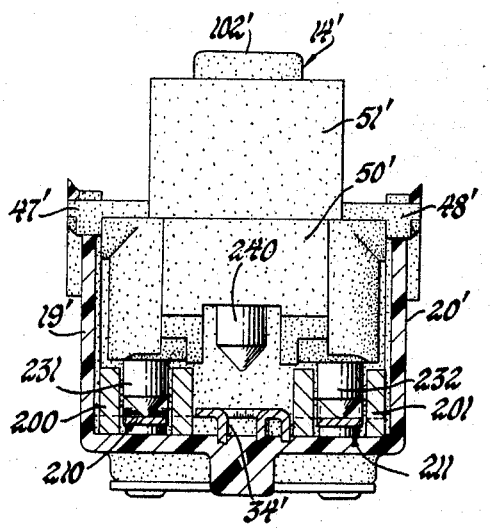
Figure 22:
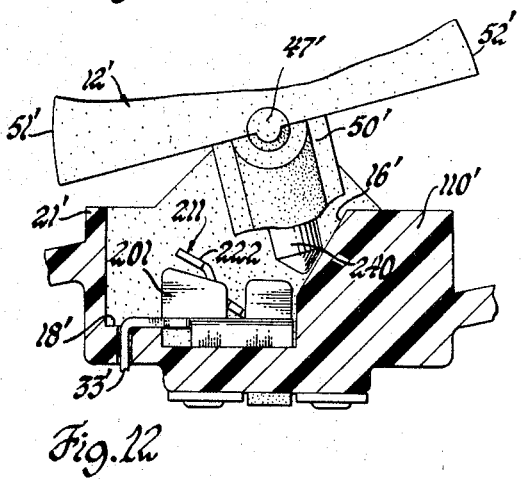

Referring to FIGS. 9 through 12 of the drawings, the wiper switch housing 10' carries a pair of U-shaped metal channels 200 and 201. The channels 200 and 201 are respectively located adjacent the side walls 19' and 20' of the switch housing 10' and are secured against the bottom 18' by metal rivets 203 and 204. The rivets 203 and 204 form stationary contacts and have flat head portions which project interiorly of the chamber 24' of the switch housing 10'. The stationary contacts 203 and 204 correspond to and are respectively adapted to be operatively connected in circuit with the wiper motor in the same manner as the contacts 30 and 32 of the switch mechanism A. Also secured to the bottom 18' of the switch housing 10' at spaced locations are stationary contacts 205 and 206. The stationary contacts 205 and 206 are electrically connected to a suitable ground, and in the same manner as the contact 31 of the switch mechanism A. The contacts 205 and 206 also have head portions which project interiorly of the housing 10', but to a lesser extent than do the heads of the contacts 203 and 204. The head portions of the contacts 203 and 205 and 204 and 206 respectively support bridge or contact plates 210 and 211, and in spaced relation to the bottom 18' of the switch housing 10'. The bridge plates 210 and 211 are oppositely disposed with respect to each other, as can be seen in FIG. 10. Since they are of an identical construction, only the bridge plate 211 will be described in detail and corresponding parts of the bridge plate 210 will be given the same reference numerals.

The bridge plate 211 includes a pair of tangs 212 and 213 extending laterally of its sides and which are respectively received in aligned notches 214 and 215 in the side walls of the U-shaped channel 200. This prevents the contact plate 211 from being displaced longitudinally of the U-shaped channel 200.

The bridge plate 211 has a flat or planar end portion 220, a generally S-shaped or reversely bent intermediate portion 221 and a generally S-shaped or reversely bent other end portion 222. The S-shaped intermediate portion of the contact plate 211 defines detent surfaces 224 and 225, as will hereinafter become more fully apparent.

The contact plates 210 and 211 at their end portions 222 engage the edge 230 defined by the side and top surfaces of the head portions of the contacts 203 and 204 and are respectively held in engagement with the same by spring biased detent means 231 and 232 carried at spaced locations by the wiper switch actuator 12'. The detent means 231 and 232 are of identical construction to and supported in the same manner as the detent means 88 of the switch mechanism A.

The bridge plate 210 is adapted to be pivoted or rocked about the edge 230 of the contact 203 to move the same out of engagement with the ground contact 205 when the actuator 12' is being moved toward its off position. Likewise the bridge plate 211 is adapted to be pivoted out of engagement with the contact 206 when the actuator 12' is moved toward its high speed position. As can be seen in FIG. 9, when the wiper switch actuator 12' is being moved towards its high speed position, as shown by the double dot-dash lines, the spring force of the detent means 232 will cause the bridge plate 211 to pivot in the direction of the arrow 240 and cause the end portion 220 of the bridge plate 211 to be moved upwardly and out of engagement with its associated ground contact 206.

When the wiper switch actuator 12' is in its off position, as shown by the solid lines in FIG. 9, the detent means 232 is in engagement with the detent surface 224 of the intermediate portion 221 of the contact plate 211 and holds the latter in engagement with both stationary contacts 204 and 206. Also, in this position the detent means 231 is in engagement with the end portion 222 of the contact plate 210 and holds the latter in a position in which its other end portion 220 is out of engagement with its associated ground contact 205.

When the wiper switch actuator 12' is moved to its low speed position, as indicated by the dot-dash lines in FIG. 9, both detent means 231 and 232 will be engaged with the detent surfaces 225 of the intermediate portion 221 of their respective bridge plates 210 and 211 whereby both bridge plates 210 and 211 are held in engagement with their associated stationary contacts. Thus, in this position both contacts 203 and 204 (which correspond to the contacts 30 and 32 of the switch mechanism A) are connected to ground and the shunt field windings are fully energized whereby low speed operation of the wiper motor is effected.

When the wiper switch actuator 12' is moved to its high speed position, as indicated by the double dot-dash lines in FIG. 9, the detent means 231 will engage the detent surface 224 of the intermediate portion 221 of the bridge plate 210 to hold the same in engagement with its associated contacts 203 and 205 and the detent means 232 will be in engagement with the end portion 222 of the contact plate 211 to cause the same to be pivoted and moved out of engagement with its associated ground contact 206. When the wiper switch actuator 12' is in this position, the shunt field windings are energized through the resistor and high speed operation is effected.

From the foregoing, it can be seen that the bridge plates 210 and 211 function both as a bridge between respective ones of the stationary contacts and as a means for releasably detenting the wiper switch actuator 12' in the position to which it is moved.

The washer switch actuator 14' is of an identical construction to and supported in the same manner by the wiper switch actuator 12' as is the washer switch actuator 14 of the switch mechanism A. The only difference is that in the washer switch actuator 14' a cylindrical metal pin 240 rather than a flat leg is employed. The cylindrical pin 40, however, cooperates with the cam surface 16' in the same manner upon being depressed to effect joint operation of the wiper and washer unit, as previously described with respect to the switch mechanism A.

From the foregoing, it can be seen that novel switch mechanisms have been provided for controlling the energization and deenergization of the wiper and washer units of a windshield cleaning apparatus for an automotive vehicle. It can also be seen that the switch mechanisms are of an extremely compact and relatively simple construction, that they can be mounted on a dashboard of a vehicle so as to be substantially flush therewith and that they can be readily actuated by using a single finger.

Although the illustrated embodiments hereof have been described in great detail, it should be apparent that certain modifications, changes, and adaptations may be made in the illustrated embodiments, and that it is intended to cover all such modifications, changes and adaptations which come within the spirit of the present invention.

What is claimed is:

1. An electric switch mechanism for controlling energization and deenergization of first and second electric circuits comprising: a switch housing; a first manually manipulatable actuator pivotally supported by said housing for movement about a given axis, said first actuator being movable between a first position in which it effects deenergization of said first circuit and a second position in which it effects energization of said first circuit; a second actuator slidably supported by said first actuator for linear movement relative thereto along an axis which extends transversely of said given axis, said second actuator being movable between a first position in which it effects deenergization of said second circuit and a second position in which it effects energization of said second circuit, biasing means engageable with said first and second actuators for biasing said second actuator towards its first position; and a cam means on said switch housing and located in the path of movement of said second actuator when the latter is moved from its first position towards its second position when the first actuator is in its first position, said cam means when engaged by said second actuator causing said first and second actuators to be rotated about said given axis and said first actuator to be moved to its second position whereby both said first and second circuits are energized substantially simultaneously.

2. An electric switch mechanism for controlling energization and deenergization of a wiper unit and a washer unit of a windshield cleaning apparatus for an automotive vehicle comprising. a switch housing; a manually manipulatable wiper switch actuator pivotally supported by said housing for movement about a given axis, said wiper switch actuator being movable between an off position in which it effects deenergization of the wiper unit and an on position in which it effects energization of the wiper unit; a washer switch actuator slidably supported by said wiper switch actuator for linear movement relative thereto along an axis which extends transversely of said pivot axis, said washer switch actuator being movable between an off position in which it effects deenergization of the washer unit and an on position in which it effects energization of the washer units; biasing means engageable with both of said actuators for biasing the washer switch actuator toward its off position; and a cam means on said switch housing and located in the path of movement of said washer switch actuator when the latter is moved from its off position towards its on position when the wiper switch actuator is in its off position, said cam means when engaged by said washer switch actuator causing both of said actuators to be rotated about said given axis and said wiper switch actuator to be moved to its on position whereby both of said wiper and washer units are energized substantially simultaneously.

3. An electric switch mechanism for controlling energization and deenergization of a wiper unit and a washer unit of a windshield apparatus for an automotive vehicle comprising: a switch housing having a bottom and a pair of upstanding spaced side walls, a plurality of spaced stationary contacts carried by said housing and with selective ones of the stationary contacts being adapted to be connected to a power source, ground and the wiper and washer units; a generally T-shaped wiper switch actuator pivotally supported by said side walls for movement about a given axis and with the stem of the T-shaped actuator extending into the housing; a bridge plate carried by said wiper switch actuator; means for biasing said bridge plate into engagement with certain ones of said stationary contacts; said wiper switch actuator being movable about said given axis between an off position in which it effects deenergization of said wiper unit and either a first or second on position in which said contact bridge bridges respective ones of said stationary contacts to respectively effect low speed and high speed energization of said wiper unit; a washer switch actuator slidably supported by said wiper switch actuator for linear movement relative thereto along an axis which intersects and extends normal to said given axis, said washer switch actuator being movable between an off position in which it effects deenergization of the washer unit and an on position in which it bridges other ones of said stationary contacts to effect energization of the washer unit; biasing means engageable with both of said switch actuators for biasing said washer switch actuator toward its off position; detent means carried by said wiper switch actuator and cooperably engageable with means on said switch housing for releasably detenting the wiper switch actuator in either of its three positions; and a camp means on said switch housing and located in the path of movement of said washer switch actuator when the latter is moved from its off position towards its on position when the wiper switch actuator is in its off position, said cam means when engaged by said washer switch actuator causing both of said switch actuators to be rotated about said given axis until said wiper switch actuator is detented in its first on position whereby both of said wiper and washer units are energized substantially simultaneously.

4. An electric switch mechanism for controlling energization and deenergization of a wiper unit and a washer unit of a windshield cleaning apparatus for an automotive vehicle comprising: a switch housing having a bottom and a pair of upstanding spaced side walls, a plurality of spaced stationary contacts carried by said housing and with certain ones having head portions which project interiorly of said housing, selective ones of the stationary contacts being adapted to be connected to a power source, ground and the wiper and washer units; a generally T-shaped wiper switch actuator pivotally supported by said side walls for movement about a given axis and with the stem of the T-shaped actuator extending into the housing; a pair of oppositely disposed bridge plates supported by said head portions of said certain ones of said stationary contacts, each of said bridge plates being pivotal about the head portion of one of its associated stationary contacts to disengage the same from its other associated contact, each of said bridge plates having a generally S-shaped intermediate portion which defines first and second detent surfaces, a pair of spring biased detent means carried by said wiper switch actuator for biasing said bridge plates into engagement with their associated stationary contacts; said wiper switch actuator being movable about said given axis between an off position in which one of the detent means pivots and holds one of the bridge plates out of engagement with its other associated contact to effect deenergization of said wiper unit, and either a first or second on position, said pair of detent means holding both of said bridge plates into engagement with their associated contacts when the wiper switch actuator is in the first on position and the other of said detent means holding the other of said bridge plates out of engagement with one of its associated contacts when the wiper switch actuator is in the second on position; a washer switch actuator slidably supported by said wiper switch actuator for linear movement relative thereto along an axis which intersects and extends normal to said given axis, said washer switch actuator being movable between an off position in which it effects deenergization of the washer unit and an on position in which it bridges other ones of said stationary contacts to effect energization of the washer unit; biasing means engageable with both of said switch actuators for biasing said washer switch actuator toward its off position; said detent means being cooperably engageable with said detent surfaces on said bridge plates for releasably detenting the wiper switch actuator in either of its three positions; and a cam means on said switch housing and located in the path of movement of said washer switch actuator when the latter is moved from its off position toward its on position when the wiper switch actuator is in its off position, said cam means when engaged by said washer switch actuator causing both of said switch actuators to be rotated about said given axis until said wiper switch actuator is detented in its first on position whereby both of said wiper and washer units are energized substantially simultaneously.

References Cited

UNITED STATES PATENTS

| 1,886,519 | 11/1932 | Bobroff. | |
| 1,893,371 | 1/1933 | Knowlton. | |
| 2,539,252 | 1/1951 | Jacobi | 200—7 |
| 2,841,659 | 7/1958 | Eitel. | |
| 3,283,088 | 11/1966 | Scow et al. | |

ROBERT K. SCHAEFER, Primary Examiner

D. SMITH, Jr., Assistant Examiner

U.S. Cl. X.R.

200—7, 67, 68